United States Patent
Olaleye et al.

(10) Patent No.: US 11,310,892 B2
(45) Date of Patent: Apr. 19, 2022

(54) SYSTEM, METHODS, AND APPARATUSES FOR DISTRIBUTED DETECTION OF LUMINAIRE ANOMALIES

(71) Applicant: SIGNIFY HOLDING B.V., Eindhoven (NL)

(72) Inventors: Olaitan Philip Olaleye, Eindhoven (NL); Tamir Hegazy, Eindhoven (NL); Abhishek Murthy, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/769,113

(22) PCT Filed: Nov. 20, 2018

(86) PCT No.: PCT/EP2018/081946
§ 371 (c)(1),
(2) Date: Jun. 2, 2020

(87) PCT Pub. No.: WO2019/110294
PCT Pub. Date: Jun. 13, 2019

(65) Prior Publication Data
US 2021/0176844 A1 Jun. 10, 2021

(30) Foreign Application Priority Data
Jan. 26, 2018 (EP) .................................... 18153601

(51) Int. Cl.
*H05B 47/165* (2020.01)
*H05B 47/175* (2020.01)
(Continued)

(52) U.S. Cl.
CPC ............ *H05B 47/165* (2020.01); *H05B 47/11* (2020.01); *H05B 47/155* (2020.01); *H05B 47/175* (2020.01)

(58) Field of Classification Search
None
See application file for complete search history.

(56) References Cited

U.S. PATENT DOCUMENTS

| 9,651,416 B2 | 5/2017 | Birru et al. |
| 10,037,689 B2 * | 7/2018 | Taylor ................. G06K 7/10475 |

(Continued)

FOREIGN PATENT DOCUMENTS

| WO | 2010086757 A1 | 8/2010 |
| WO | 2017076680 A1 | 5/2017 |
| WO | 2017086963 A1 | 5/2017 |

*Primary Examiner* — Crystal L Hammond (57) ABSTRACT

The described implementations provided herein relate to systems, methods, and apparatuses for using a network of luminaires to perform distributed computation of sensor data to identify hardware and network anomalies. In some implementations, a method is set forth as including operations such as receiving, from a first luminaire (114, 128, 216), first sensor data (122, 124) in response to a stimulus (204) affecting a network of luminaires (110), and receiving, from a second luminaire (208) in the network of luminaires, second sensor data. The method can also include determining a correlation between the first sensor data and the second sensor data, and modifying a luminaire spatial-temporal model (222) based at least partially on the correlation. The method can also include receiving subsequent sensor data from the first luminaire or the second luminaire, and providing a signal (212) to the first luminaire or the second luminaire based on a comparison of the subsequent sensor data to the luminaire spatial-temporal model.

19 Claims, 5 Drawing Sheets

(51) Int. Cl.
*H05B 47/11* (2020.01)
*H05B 47/155* (2020.01)

(56) References Cited

U.S. PATENT DOCUMENTS

| | | |
|---|---|---|
| 2015/0069920 A1 | 3/2015 | Denteneer et al. |
| 2015/0181678 A1* | 6/2015 | Sachs .................... H05B 47/19 315/152 |
| 2016/0216974 A1 | 7/2016 | Hanebutte et al. |
| 2017/0060574 A1 | 3/2017 | Malladi et al. |
| 2017/0192871 A1 | 7/2017 | Hara et al. |

\* cited by examiner

SYSTEM, METHODS, AND APPARATUSES FOR DISTRIBUTED DETECTION OF LUMINAIRE ANOMALIES

CROSS-REFERENCE TO PRIOR APPLICATIONS

This application is the U.S. National Phase application under 35 U.S.C. § 371 of International Application No. PCT/EP2018/081946, filed on Nov. 20, 2018, which claims the benefits of European Patent Application No. 18153601.2, filed on Jan. 26, 2018 and U.S. Patent Application No. 62/594,801, filed Dec. 5, 2017. These applications are hereby incorporated by reference herein.

TECHNICAL FIELD

The present disclosure is directed generally to luminaires with onboard sensors. Specifically, the implementations discussed herein related to detecting hardware and network anomalies using distributed processing of data collected by luminaires.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some lighting devices can incorporate sensors for collecting data about an environment of the lighting devices. However, by incorporating such sensors, an amount of data being transmitted over a network associated with the lighting devices can be excessive, thereby limiting a bandwidth of the network. Furthermore, by impeding network communications, crucial diagnostic tests performed on the lighting devices over the network can be limited. Moreover, by indiscriminately collecting data from a network of lighting devices, computational resources can be wasted on processing data that may not provide insights into optimizing lighting device operations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations.

DETAILED DESCRIPTION

The described implementations relate to systems, methods, and apparatuses for using a network of luminaires to perform distributed computation of sensor data to identify hardware anomalies. In some implementations, a method implemented by one or more processors is set forth as including operations such as generating, at a computing device of a first luminaire, first sensor data corresponding to a stimulus affecting a network of luminaires that includes the first luminaire. The method can further include receiving, at the computing device of the first luminaire, second sensor data from a second luminaire in the network of luminaires. The second sensor data can be generated by the second luminaire in response to the stimulus. The method can also include accessing a luminaire spatial-temporal model. The luminaire spatial-temporal model can be based on historical sensor data collected from at least the first luminaire and the second luminaire. The method can further include determining variance data from the luminaire spatial-temporal model. The variance data can be based on a difference between the historical sensor data and the first sensor data, and a difference between the historical sensor data and the second sensor data. The operations can also include, when a variance is identified in the variance data, causing a signal to be transmitted based on the variance. The signal can cause the first luminaire or the second luminaire to compensate for the variance. Compensating for the variance can include limiting an amount of data that is provided from a sensor of the first luminaire or the second luminaire. The variance data can include probabilistic metrics, and the method can further include determining that at least one probabilistic metric of the probabilistic metrics satisfies a probabilistic threshold. The first sensor data or the second sensor data can include data from multiple different types of sensors. The method can further include determining a change in correlation between data from the multiple different types of sensors. At least one probabilistic metric can be based on the change in correlation. The historical sensor data can include gradient distribution data for sensors integral to the network of luminaires. The variance can correspond to an amount of latency in a response to the stimulus, and the method can further include causing the luminaire spatial-temporal model to be modified according to the signal. The signal can be based on the amount of latency in the response of the first luminaire or the second luminaire to the stimulus.

In other implementations, a computing device is set forth as including one or more processors, and memory connected to the one or more processors. The memory can include instructions that, when executed by the one or more processors, cause the one or more processors to perform operations that include: receiving, from a first luminaire, first sensor data in response to a stimulus affecting a network of luminaires that the one or more processors are in communications with. The operations can also include receiving, from a second luminaire, second sensor data in the network of luminaires. The second sensor data can be generated by the second luminaire in response to the stimulus. The operations can also include determining a correlation between the first sensor data and the second sensor data, and modifying a luminaire spatial-temporal model based at least partially on the correlation between the first sensor data and the second sensor data. Additionally, the operations can include receiving subsequent sensor data from the first luminaire or the second luminaire, and providing a signal to the first luminaire or the second luminaire based on a comparison of the subsequent sensor data to the modified luminaire spatial-temporal model. Determining the correlation can include generating a probabilistic metric, and the operations can further include determining that the probabilistic metric satisfies a probabilistic threshold. The first sensor data or the second sensor data include data from multiple types of sensors. Determining the correlation can include determining a change in correlation between data from the multiple types of sensors. The luminaire spatial-temporal model can be based on gradient distribution data for multiple types of sensors integrated into the network of luminaires, and the multiple types of sensors can include at least a passive infrared sensor.

In yet other implementations, a system is set forth as including one or more processors, and memory configured to store instructions that, when executed by the one or more processors, cause the one or more processors to perform operations that include: generating first sensor data at the one or more processors. The one or more processors are in communication with a network of luminaires. The operations can also include receiving second sensor data from a luminaire in the network of luminaires. The second sensor data can be generated by the luminaire. The operations can also include comparing the first sensor data and the second sensor data to a luminaire spatial-temporal model to identify a variance between the first sensor data and the luminaire spatial-temporal model or the second sensor data and the luminaire spatial-temporal model. The luminaire spatial-temporal model can be based on historical sensor data collected from adjacent luminaires in the network of luminaires. Additionally, the operations can include, when the variance is identified, causing the one or more processors, or the luminaire, to operate to compensate for the variance. The variance can correspond to a probabilistic metric, and the operations can further include: determining that the probabilistic metric satisfies a probabilistic threshold. The first sensor data or the second sensor data can include data from multiple types of sensors. The operations can further include: determining a change in correlation between data from the multiple different types of sensors. In some implementations, the operations can include modifying the luminaire spatial-temporal model based on the one or more processors, or the luminaire, operating to compensate for the variance. The luminaire spatial-temporal model can be stored in the memory. Compensating for the variance data can include limiting an amount of data that is provided from a sensor. The luminaire spatial-temporal model can identify gradient distributions for the historical sensor data collected from the adjacent luminaires. The system can further include a lighting device, and the first sensor data and the second sensor data can be based on an amount of light detected at an area illuminated by the network of luminaires.

Network bandwidth availability can be an issue when interconnected devices, such as luminaires, indiscriminately transmit data across networks for purposes of having such data be used for downstream processing. Furthermore, memory and processing performance for each luminaire can be diminished when each luminaire is configured to collect and transmit data from multiple different luminaires in a network. Such limitations on network bandwidth and hardware capabilities can waste computational resources, and potentially negatively impact maintenance processes that rely on data being provided from various network devices.

In order to provide a network of luminaires capable of predicting network and/or hardware and/or network anomalies without wasting computational resources and without requiring the luminaires to indiscriminately provide sensor data across a network, individual luminaires can be tasked with processing collected data according to a predictive spatial-temporal model. A spatial-temporal model can be generated from sequences of data being transmitted from multiple luminaires that are connected in a network. The data can be provided based on signals/data provided by sensors connected to, or incorporated in, the luminaires. Such sensors can include, but may not be limited to, passive infrared sensors, timing sensors, temperatures sensors, humidity sensors, $CO_2$ sensors, current sensors, resistance sensors, voltage sensors, pressure sensors, tactile sensors, motion sensors, light sensors, and/or any other sensor that can provide data associated with an environment. The spatial-temporal model can be initially generated according to an amount of lag or delay exhibited when luminaires are transmitting data. The lag can be identified and used to determine how luminaires are distributed over one or more areas.

Anomalies can be identified in multiple different ways, including tracking correspondence between different sensors, and/or tracking differences in data caused by spatial-temporal characteristics of each luminaire in a network of luminaires. For instance, identifying a correspondence between different sensors can be performed by comparing how outputs from sensors change differently in response to a common stimuli and/or environmental change. For example, a group of people can enter a room that includes a network of luminaires, with each luminaire having a passive infrared (PIR) sensor and a humidity sensor. As people enter from one area of the room, each PIR sensor and temperature sensor from each luminaire can respond differently. The differences in responses can be tracked, along with the patterns of movement of people in the room, in order to generate a predictive model from which hardware response anomalies can be identified. Although correspondence between different types of sensors can provide insights into certain anomalies, responses from the same types of sensors can also be analyzed in order to identify anomalies.

In some implementations, the spatial-temporal model can be used to predict hardware malfunctions from data anomalies by tracking patterns of responses from sensors over space and time. For example, each luminaire of a network of luminaires can include a light sensor that is responsive to changes in light that occur in an area illuminated by the network of luminaires. As an amount of artificial light changes the luminance of a room each day, the amount of light measured by the light sensors can also change. The changes in measured light can be reflected over time and space such that patterns can emerge. Anomalies in light sensor responses can thereafter be identified when responses of one or more sensors is outside of a tolerance of predicted values for the responses at particular locations and/or times.

Figure 1:
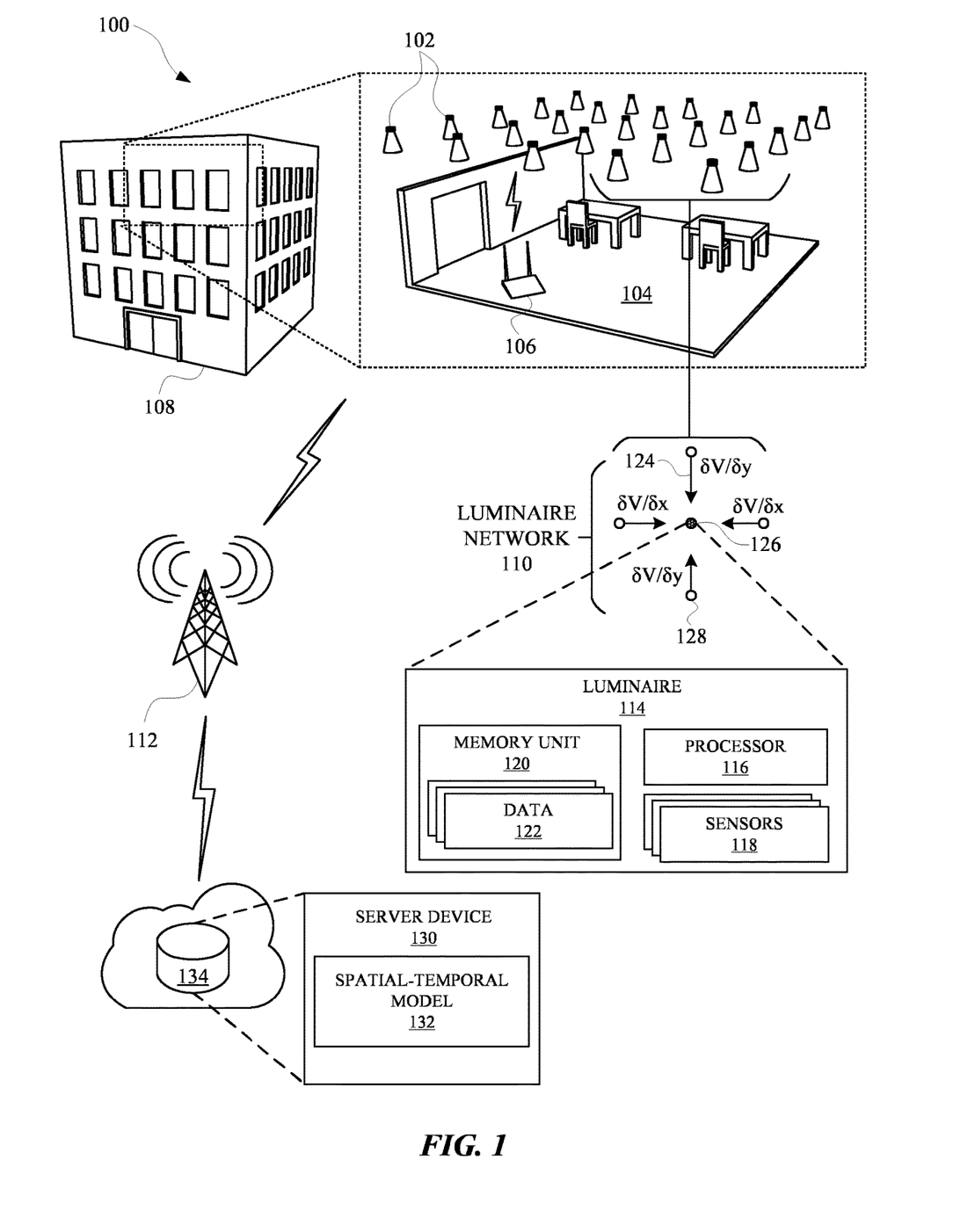
FIG. 1 illustrates a system for compiling a spatial-temporal model for a luminaire network.

FIG. 1 illustrates a system 100 for compiling spatial-temporal model for a luminaire network 110. One or more operations performed by the system 100 can be embodied as software instructions stored and/or executed by one or more computing device. The system 100 can include a luminaire network 110 that includes multiple luminaires 114 connected to a network device 106 in one or more areas 104 in one or more buildings 108. Each luminaire 114 of the luminaire network 110 can include at least one or more processors 116, one or more sensors 118, and/or one or more memory units 120 with data 122 stored in a memory unit 120. The processor 116 can process signals from the sensors 118 and cause sensor data from the sensors 118 to be transmitted to neighboring luminaires in order to assist in building one or more spatial-temporal models 132.

The spatial-temporal model 132 can be stored at one or more devices such as a remote device 134 (e.g., a server device 130), a network device 106, one or more luminaires 114, and/or any other device that can be in communication with the luminaires 114 over a network 112 (e.g., the internet). The spatial-temporal model 132 can be generated using location data $(x_n, y_n)$ obtained from the luminaires 114 and/or any other source of information capable of defining locations for the luminaires 114 in the building 108. The location data can be used for providing a correspondence between sensor data and the locations to which the sensors 118 are responsive. The location data can therefore define the spatial dimensions of the spatial-temporal model 132 such that sensor data can be mapped over time in order to determine various metrics related to how sensor data from each luminaire 114 regularly changes over time.

For example, initially the luminaires 114 are assumed to be free from any substantive errors that would affect their operations. At different times t, or periodically according to a predefined interval, each luminaire 114 of the luminaire network 110 can record sensor data from its sensor 118 and can transmit the sensor data to immediate neighbor. For instance, a sensor data value $V(x_t, y_t, t)$ can be recorded by the luminaire 114 that originated the sensor data value. The luminaire 114 can cause the sensor data value $V(x_t, y_t, t)$ to be transmitted to one or more neighboring luminaires 114 such that any luminaire 102 will have one or more of a forward ("f"), backward ("b"), upward ("u"), and/or downward ("d") sensor value (i.e., a sensor value for each neighbor, if the luminaires 114 are arranged according to the luminaire network 110 of FIG. 1). As illustrated in FIG. 1, a luminaire 126 can receive sensor values 124 from neighboring luminaries 128, such that the luminaire 126 will be able to process the sensor values 124 to generate data 122, which can include gradient data. The gradient data can be defined according to the following Equations (1)-(4).

$$\frac{\delta V}{\delta x}\bigg|_{(x_t, y_t)}^{f} = V(x_t + 1, y_t) - V(x_t, y_t) \quad (1)$$

$$\frac{\delta V}{\delta x}\bigg|_{(x_t, y_t)}^{b} = V(x_t, y_t) - V(x_t - 1, y_t) \quad (2)$$

$$\frac{\delta V}{\delta y}\bigg|_{(x_t, y_t)}^{u} = V(x_t, y_t + 1) - V(x_t, y_t) \quad (3)$$

$$\frac{\delta V}{\delta y}\bigg|_{(x_t, y_t)}^{d} = V(x_t, y_t) - V(x_t, y_t - 1) \quad (4)$$

Using the sensor value generated by the luminaire 126, and the sensor values provided by each of the neighboring luminaires 128, spatial gradients corresponding to differences in sensor values between luminaires 102 on the network can be tracked. Furthermore, various metrics can be generated from the spatial gradients over time and/or with respect to multiple different types of sensors. Such metrics can include a mean value at a given time and for a given type of measurement, a variance between values, a normal distribution of the values, and/or any other metric that can be used to identify changes in data and/or correlations between data. In implementations, the metrics can be any metric that can be computed while compressing data, such as, for example, various errors, predictions, means, ratios, scores, totals, and/or any other compression-based metrics. Over time, any particular luminaire 114 can process received and generated data to determine how sensor values generated at a particular luminaire 114 compare to other luminaires 102 in a network of luminaires. In this way, calculations for predicting anomalies can be performed at least in part by individual luminaires 114 using the spatial-temporal model 132 managed by the luminaire network 110 or an individual luminaire 114. Should an anomaly, such as a sensor value being outside of a predetermined tolerance or variance, be detected by a luminaire 114, the luminaire 114 can (i) control its sensor to no longer produce data or (ii) otherwise operate to compensate for the anomaly. In this way, systems for quantifying luminaire health can reliably track the performance of individual luminaires without having to query all luminaires in a network, thereby saving computational resources, network bandwidth, and power.

Figure 2:
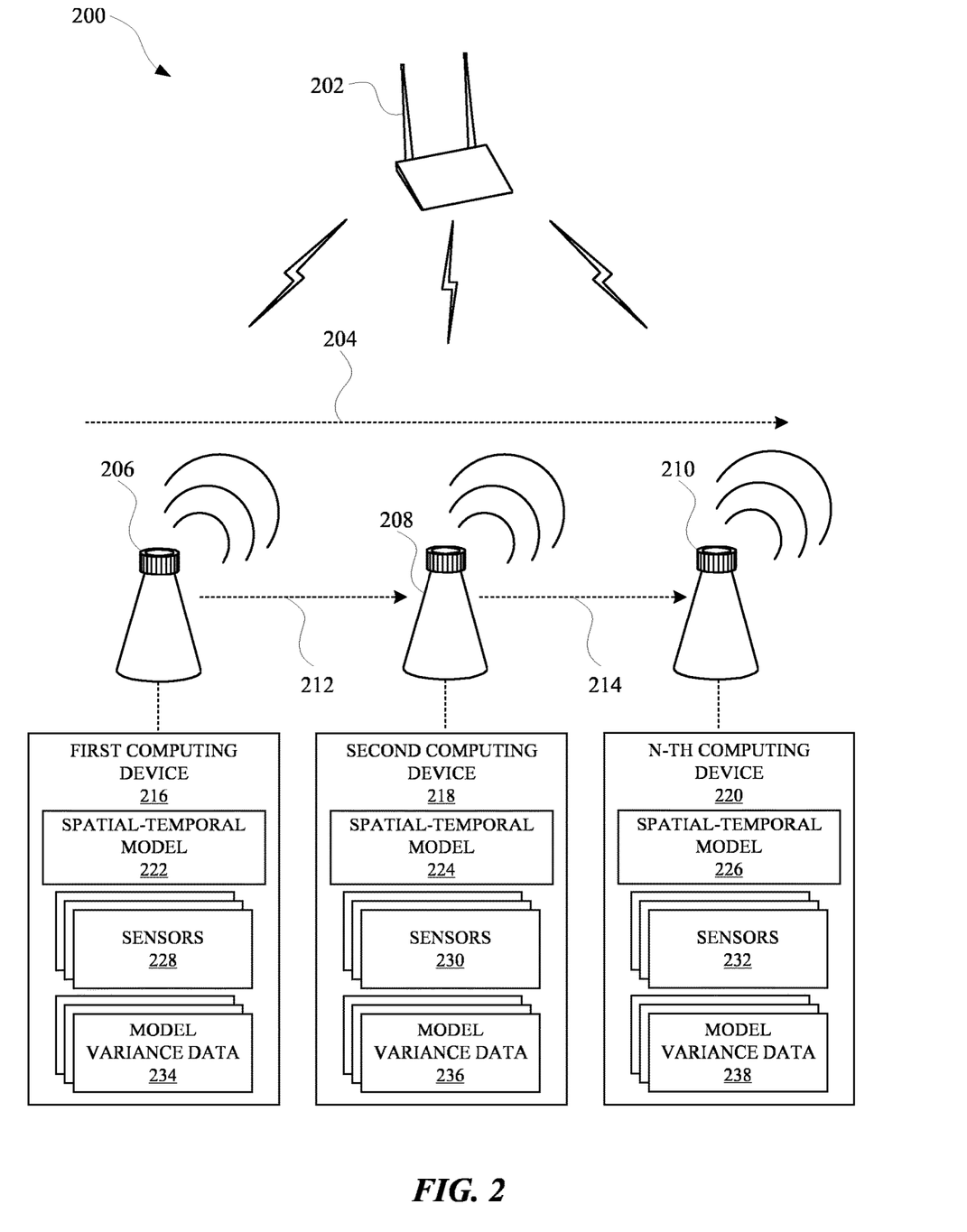
FIG. 2 includes a process diagram that illustrates how spatial-temporal models can be used to detect and/or predict anomalies in luminaire operations.

FIG. 2 includes a process diagram 200 that illustrates how spatial-temporal models can be used to detect and/or predict anomalies in luminaire operations. Specifically, the spatial-temporal models can be used to identify response latency, response accuracy, and/or other indicators of malfunctioning luminaires based on how the luminaires respond to a common stimulus 204. Each of the luminaires (first luminaire 206, second luminaire 208, and N-th luminaire 210) can include one or more computing devices (e.g., first computing device 216, second computing device 218, and N-th computing device 220). Each computing device of each luminaire can be in communication with each other as well as a network device 202 (e.g., a gateway device and/or any other device capable of transmitting network signals). In order to use the spatial-temporal model to detect and/or predict anomalies in luminaire operations, for example, each luminaire can measure and transmit sensor data for processing by neighboring luminaires.

Each luminaire can measure an environmental condition of a respective luminaire using one or more sensors attached to the luminaire. For example, the first luminaire 206 can include one or more sensors 228, the second luminaire 208 can include sensors 230, and N-th luminaire 210 can include sensors 232. Each computing device of the luminaries can cause their respective sensor(s) to collect sensor data from their respective sensor, store the sensor data, and transmit the sensor data to a neighboring luminaire. For instance, each luminaire can measure a temperature of an environment of the luminaire. Temperature data collected by each luminaire can be compared to a spatial-temporal model available to each luminaire. Each computing device can store and/or access a spatial-temporal model respectively (e.g., spatial-temporal model 222, spatial-temporal model 224, and/or spatial-temporal model 226). In some implementations, each computing device can access the same spatial-temporal model and in other implementations each computing device can access one or more different spatial-temporal models. For example, an individual spatial-temporal model can be based on data collected from one or more sensors at a luminaire, and will therefore be generated from the perspective of that luminaire. Luminaires in different locations and/or experiencing different environments will have different spatial-temporal models as a result.

When each luminaire has collected sensor data from their respective sensor(s), each luminaire can transmit the sensor data to a neighboring luminaire. For instance, the first luminaire 206 can provide a signal 212 to the second luminaire 208, and the second luminaire 208 can provide a signal 214 to the N-th luminaire 210. The signal 212 can embody the sensor data collected by the first luminaire 206, and the signal 214 can embody the sensor data collected by the second luminaire 208. In some implementations, each luminaire can use a received signal to determine a lag or latency in a transmission of a signal between luminaires. For example, the spatial-temporal model 224 can include one or more tables identifying response times for one or more neighboring luminaires. Therefore, when the second luminaire 208 receives the signal 212, the time of receipt can be compared to a time metric provided by the spatial-temporal model 224. The time metric can be an average time of receipt, a previous time of receipt, a delay in receipt, and/or any other time metric that can be associated with signal transmissions. The second computing device 218 can use the time metric to generate model variance data 236, which can identify whether the signal 212 is indicative of an operational anomaly. For example, the second computing device 218 can store or access a threshold tolerance for the time metric, and if the signal 212 does not satisfy the threshold tolerance, the second computing device 218 can provide an indication to the network device 202 indicating that the first luminaire 206 is exhibiting an operational anomaly. Furthermore, the second computing device 218 can communicate the type of anomaly being exhibited by the first luminaire 206, as well as any contextual data related to the anomaly, such as data from other sensor collected at the time of the anomaly. In response, the network device 202 can cause the first luminaire 206 to operate differently or at least partially shut down one or more of its sensors in order to compensate for the anomaly.

In some implementations, each computing device of each luminaire can determine correlations between data from different sensors of a respective luminaire. For example, at a given time, the first luminaire 206 can process sensor data from multiple different sensors 228 (e.g., a temperature sensor and a humidity sensor) in order to identify a correlation metric between the sensor data. The correlation metric, which can identify a variance between the sensor data and/or some other metric from the sensor data, can be transmitted by the first luminaire 206 to the second luminaire 208. The second luminaire 208 can compare the correlation metric to the spatial-temporal model 224 to determine how the correlation metric varies from other a correlation metric generated at the second luminaire 208 and/or other neighboring luminaires 128. Model variance data 236 can be generated based on a comparison between the correlation metrics from the first luminaire 206 and the second luminaire 208. The model variance data 236 can be used by the second luminaire 208 to determine whether to modify an operation of the first luminaire 206 in order to compensate for any anomalies indicated in the model variance data 236.

In some implementations, model variance data can be tracked by each luminaire and/or the network device (e.g., model variance data 234, model variance data 236, and model variance data 238). The model variance data can be used to make predictions about how luminaires will operate in the future and/or in response to subsequent environmental changes. In this way, maintenance schedules for the luminaires can be based on how data provided by the luminaires compares to the spatial-temporal model. For example, the network device 202 can receive a signal indicating that the N-th luminaire 210 has, on multiple occasions, provided sensor data that does not satisfy a threshold tolerance for the type of sensor data. In response, the network device 202 can cause a change in a maintenance schedule to occur to reflect that the N-th luminaire 210 is in need of repair.

In some implementations, the model variance data generated at each luminaire can be based on a time varying stimulus 204 that can affect a sensor of each luminaire over time and/or space through which the stimulus 204 moving. For example, the stimulus 204 can be a change in motion, temperature, humidity, voltage, current, brightness, and/or any other physical change that can be detected by a sensor. When the stimulus 204 is ambient light, an amount of brightness or luminance can be detected by a light sensor in each of the luminaires. Each sensor can be responsive to the change in ambient light and store data corresponding to an amount of light that was detected at a particular time. The ambient light data can be shared with neighboring luminaires in response to the stimulus 204 and the neighboring luminaires can compare the ambient light data to the spatial-temporal model. The spatial-temporal model can be generated based, at least in part, on previous collections of ambient light data over time. The spatial-temporal model can therefore provide an indication of ambient light values that are normal for a particular time and location of a sensor. When an amount of ambient light detected by a sensor does not satisfy a tolerance threshold for a normal value, the luminaire corresponding to the sensor can be identified by another luminaire and/or the network device 202 as operating abnormally. The abnormal luminaire and/or sensor can then be designated for maintenance and/or at least partially shut down in order to compensate for the detected abnormality. In this way, data collected from a luminaire network can be made more accurate as a result of inaccurate sensor data being eliminated from the network.

Figure 3:
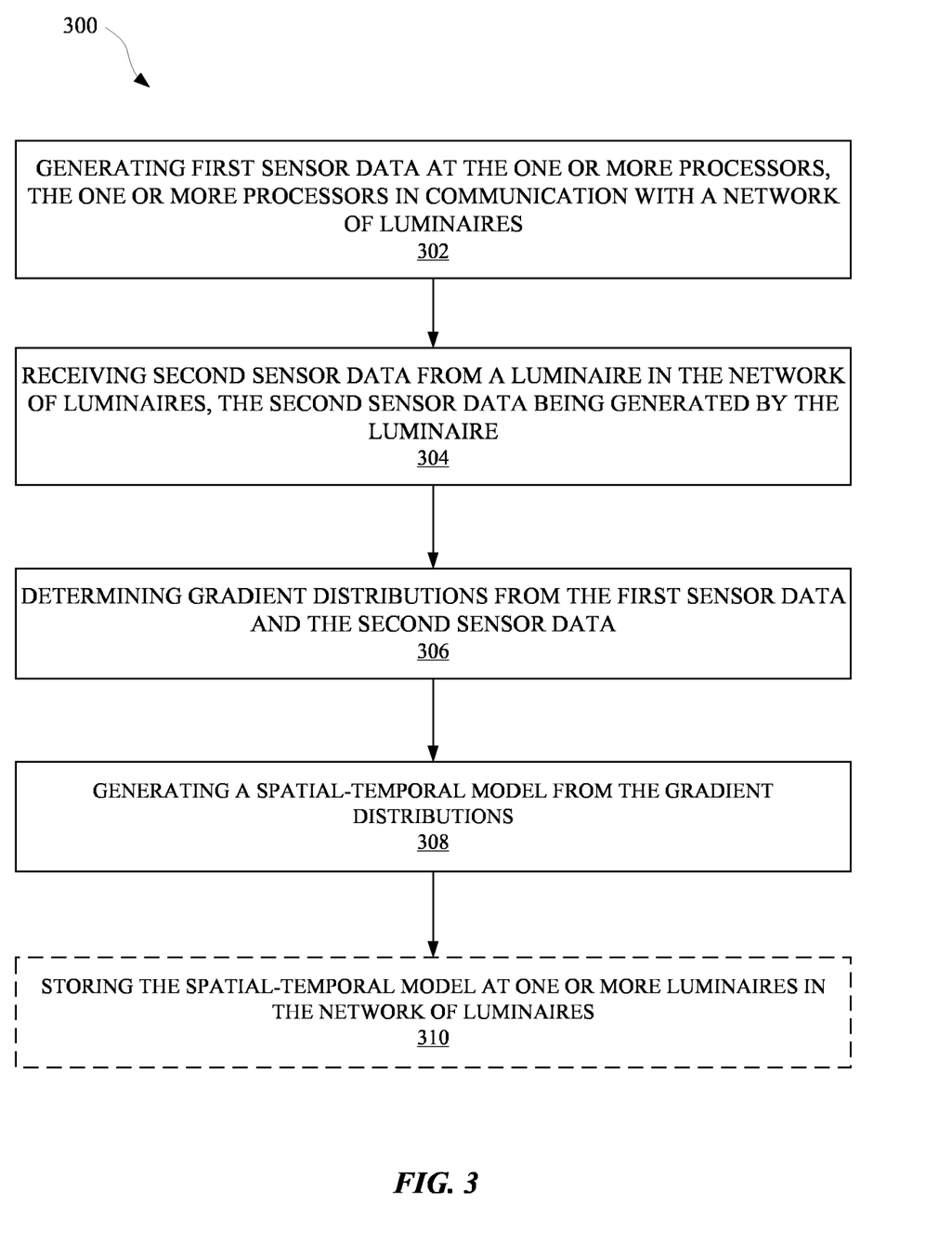
FIG. 3 illustrates a method for providing a spatial-temporal model to diagnose and/or predict operational anomalies occurring at a network of luminaires.

FIG. 3 illustrates a method 300 for providing a spatial-temporal model to diagnose and/or predict operational anomalies occurring at a network of luminaires. The method 300 can be performed by one or more luminaries, computing devices, network devices, and/or any other device capable of processing sensor data. The method 300 can include an operation 302 of generating first sensor data at the one or more processors. The one or more processors can be in communication with a network of luminaires and can be integral to a luminaire in the network of luminaires. In some implementations, the one or more processors can operate as a controller for modifying operations of the luminaire according to feedback received from one or more sensors of the luminaire and/or other luminaires in the network of luminaires.

The method 300 can also include an operation 304 of receiving second sensor data from a luminaire in the network of luminaires. The second sensor data can be generated by another luminaire in the network of luminaires. The first sensor data and the second sensor data can each include data from one or more of the same or different types of sensors. For instance, each of the first data and the second data can include data from a sensor that can be responsive to temperature, humidity, passive infrared, current, voltage, resistance, moisture, chemical, proximity, images, touch, motion, light, and/or any other property that can be observed by a sensor.

The method 300 can further include an operation 306 of determining gradient distributions from the first sensor data and the second sensor data. The gradient distributions correspond to differences in sensor data between adjacent or proximate luminaires in the network of luminaires. In some implementations, a luminaire can receive sensor data from at least two different luminaires in the network of luminaires in order to generate gradient distribution data. In some implementations, the gradient distribution data can be based on data derived from multiple different types of sensors. For example, sensor data corresponding to data that correlates sensor values from at least two different types of sensors (e.g., a temperature sensor and a humidity tensor, a voltage sensor and a light sensor, and/or any other combination of sensor types).

The method 300 can also include an operation 308 of generating a spatial-temporal model from the gradient distributions. The spatial-temporal model can include normal gradient distributions for one or more types of sensor data transmitted by sensors integral to the network of luminaires. The spatial-temporal model can be generated from data that is collected over one or more periods of time, in order to that various environmental changes can be taken into consideration when generating the spatial-temporal model. For example, the network of luminaires can be located in a building that includes an HVAC system that causes the temperature of the building to change throughout each day. Therefore, any temperature and/or humidity sensors integral to the luminaires in the network of luminaires can provide different sensor data over the course of the day. As a result, the spatial-temporal model can include gradient distribution data corresponding different points in time, in order that subsequent sensor data can be checked for anomalies that can occur as an environment of the network of luminaires changes. Furthermore, the spatial-temporal model can be updated and/or modified over time in order to compensate for detected latency in sensor measurements. For instance, each luminaire in the network of luminaires can measure a latency of signals transmitted to each luminaire and compare the latency to an expected latency or threshold. When a measured latency does not satisfy a threshold or is not substantially similar to the expected latency, the spatial-temporal model can be updated to compensate for the measured latency.

Figure 4:
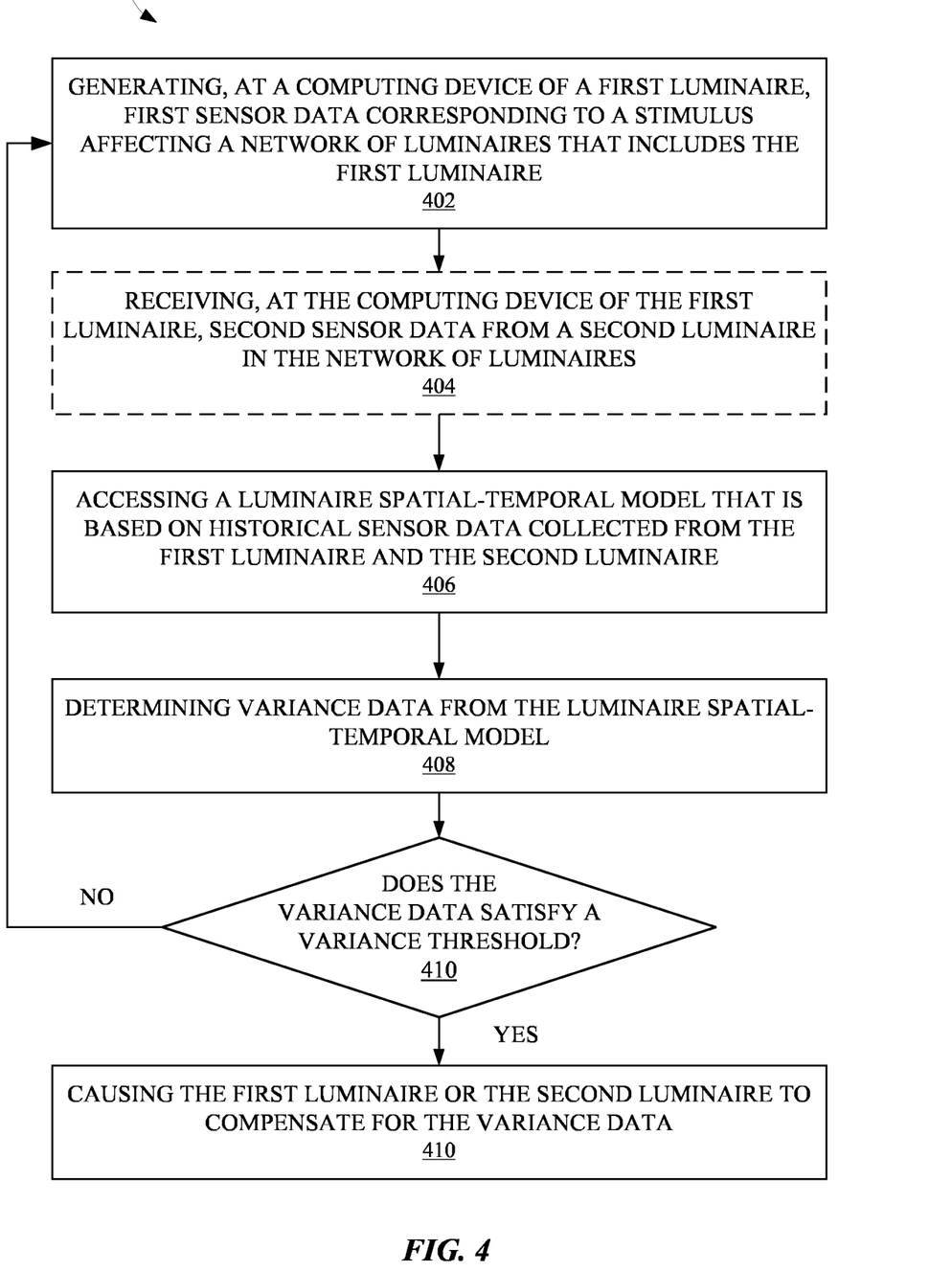
FIG. 4 illustrates a method for causing a luminaire in a network of luminaires to compensate for an anomaly identified using a spatial-temporal model.

The method 300 can optionally include an operation 310 of storing the spatial-temporal model at one or more luminaires in the network of luminaires. For example, the spatial-temporal model can be embodied in data that is stored at a luminaire in the network of luminaires in order that subsequently received sensor can be compared with the spatial-temporal model. Alternatively, the spatial-temporal model can be stored at multiple luminaires in the network of luminaires in order that each luminaire can provide indications of anomalies that can occur internally or at a separate luminaire in a network of luminaires. FIG. 4 illustrates a method 400 for causing a luminaire in a network of luminaires to compensate for an anomaly identified using a spatial-temporal model. The method 400 can be performed by one or more luminaries, computing devices, network devices, and/or any other device capable of processing sensor data. The method 400 can include an operation 402 of generating, at a computing device of a first luminaire, first sensor data corresponding to a stimulus affecting a network of luminaires that includes the first luminaire. The stimulus can be a change of one or more environmental conditions such as a temperature change, an occupancy increase or decrease in a space illuminated by the network of luminaires, electrical changes, and/or any other change that can affect an environment of a luminaire.

The method 400 can also include an optional operation 404 of receiving, at the computing device of the first luminaire, second sensor data from a second luminaire in the network of luminaires. The second sensor data can be provided by the second luminaire in response to the stimulus. Furthermore, the second sensor data can be based on an operation of one or more sensors of the second luminaire. For example, the second sensor data can include data that identifies a correlation between signals from two or more sensors of the second luminaire. In this way, anomalies occurring during operations of a luminaire can be based on how a combination of components are operating in response to changes in an environment of the luminaire.

In some implementations, the first luminaire does not necessarily have to receive data from a neighboring luminaire or transmit data to a neighboring luminaire. For instance, each luminaire in a network of luminaires can communicate with a gateway device that processes the communicated data. The gateway device can then compare the communicated data with a spatial-temporal model to identify anomalies occurring at one or more luminaires in the network of luminaires. Alternatively, one or more luminaires can communicate data to neighboring luminaires, in order that communicated data can be retransmitted to edge node luminaires of the network of luminaires. The edge node luminaires can then process the communicated data, thereby conserving computational resources and network bandwidth over the network of luminaires. One or more of the edge node luminaires can then transmit one or more signals to a luminaire in the network of luminaires in order to compensate for any anomalies identified by an edge node luminaire.

The method 400 can further include an operation 406 of accessing a luminaire spatial-temporal model that is based on historical sensor data collected from the first luminaire and/or the second luminaire. The historical sensor data can be collected when each of the first luminaire and/or the second luminaire were previously responding to a similar stimulus. Alternatively, the historical sensor data can be collected when each of the first luminaire and/or the second luminaire were previously responding to programmed stimulus and/or a diagnostics test that can toggle or otherwise modify an operation of each luminaire. The method 400 can also include an operation 408 of determining variance data from the luminaire spatial-temporal model. The variance data can include probabilistic metrics, which can be compared to one or more thresholds for determining whether an anomaly has occurred at a luminaire of the network of luminaires. For example, a T-test can be performed in order to determine a p-value, which can be compared to a threshold determine whether a null hypothesis of the T-test should be rejected, or not, under current circumstances. The null hypothesis can be, for instance, a rule or assumption that sensor data or a gradient value associated with a luminaire is not significantly different than a nominal distribution of the sensor data and/or gradient value. For example, sensor data that is significantly different can satisfy a variance threshold that defines a minimum and/or maximum boundary for the sensor data. Alternatively, a p-value can be generated from sensor data and/or gradient value data, and the p-value can be compared to a threshold. If the p-value does, or does not satisfy the threshold (depending on the implementation and/or how the p-value threshold is defined), the null hypothesis can be rejected and the luminaire that is associated with the p-value can be flagged as faulty. If a threshold number of rejections occur for data coming from a luminaire, the luminaire or a separate luminaire can cause the luminaire to modify its operations to compensate for the faulty data.

The method 400 can include a determination 410 where the variance data is compared to a variance threshold to determine whether the variance data satisfies the threshold. If the variance data satisfies the variance threshold, the method 400 can proceed to operation 412 where the first luminaire or the second luminaire is caused to compensate for the variance data. In other words, the first luminaire or the second luminaire can suppress sensor measurements occurring at one or their respective sensors and/or at least temporarily shutdown until maintenance can be performed at the first luminaire or the second luminaire. However, if the variance data does not satisfy the variance threshold, the method 400 can proceed back to operation 402 where first sensor data is again generated for comparing with the spatial-temporal model.

Figure 5:
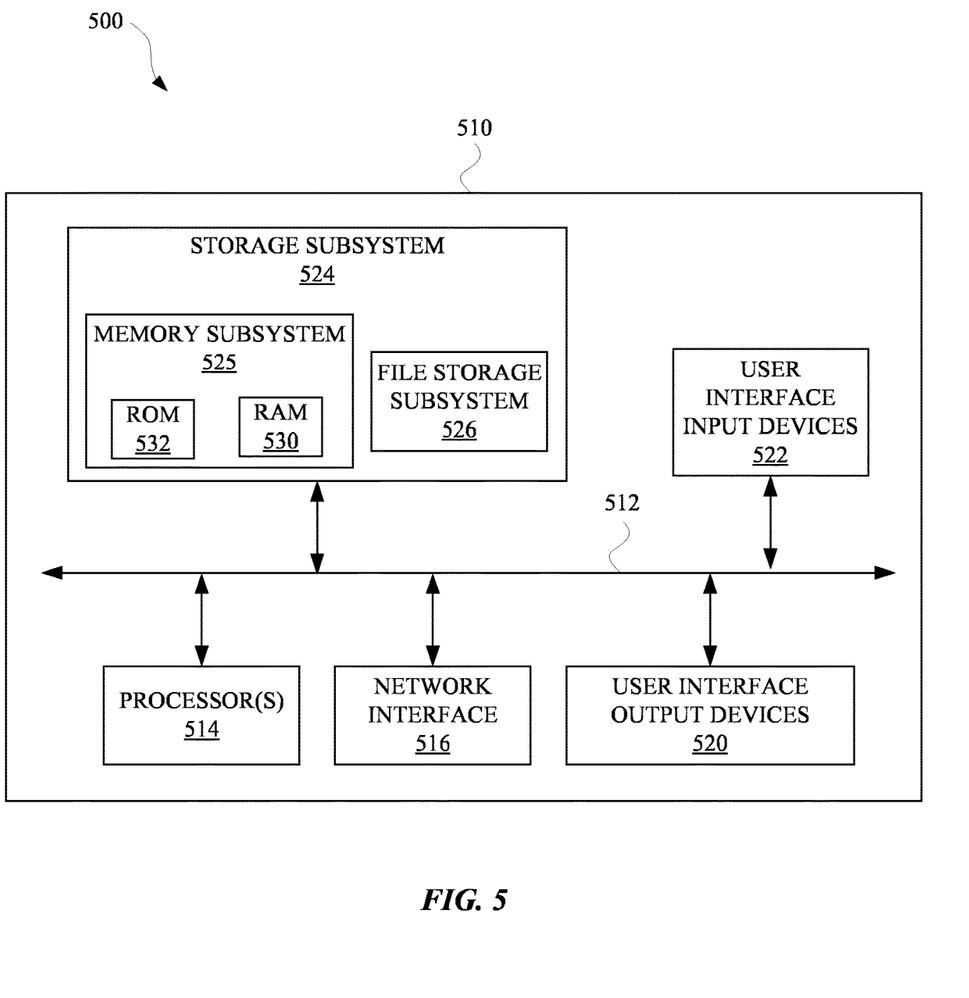
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or to implement one or more of the system 100, the luminaire 114, the server device 130, the luminaire network 110, the network device 202, and/or any of the luminaires and/or devices discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The term "lighting fixture" or "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller, which employs one or more microprocessors that may be programmed using software (e.g., machine code) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or machine code) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The invention claimed is:

1. A method for detecting sensor health implemented by one or more processors, the method comprising:
    generating, at a computing device of a first luminaire, first sensor data corresponding to a stimulus affecting a network of luminaires that includes the first luminaire;
    receiving, at the computing device of the first luminaire, second sensor data from a second luminaire in the network of luminaires, wherein the second sensor data is generated by the second luminaire in response to the stimulus;
    accessing a luminaire spatial-temporal model, wherein the luminaire spatial-temporal model is based on historical sensor data collected from at least the first luminaire and the second luminaire;
    determining variance data from the luminaire spatial-temporal model, the variance data based on a difference between the historical sensor data and the first sensor data, and a difference between the historical sensor data and the second sensor data, wherein the variance data includes probabilistic metrics;
    determining that at least one probabilistic metric of the probabilistic metrics satisfies a probabilistic threshold; and
    when a variance is identified in the variance data: causing a signal to be transmitted based on the variance, wherein the variance corresponds to an amount of latency in a response to the stimulus.

2. The method of claim 1, wherein the signal causes the first luminaire or the second luminaire to compensate for the variance, wherein compensating for the variance includes limiting an amount of data that is provided from a sensor of the first luminaire or the second luminaire.

3. The method of claim 1, comprising:
    determining that at least one subsequent probabilistic metric of the probabilistic metrics does not satisfy the probabilistic threshold.

4. The method of claim 1, wherein the first sensor data or the second sensor data includes data from multiple different types of sensors.

5. The method of claim 4, further comprising:
    determining a change in correlation between data from the multiple different types of sensors, wherein the at least one probabilistic metric is based on the change in correlation.

6. The method of claim 1, wherein the historical sensor data includes gradient distribution data for sensors integral to the network of luminaires.

7. The method of claim 1, comprising:
    causing the luminaire spatial-temporal model to be modified according to the signal, wherein the signal is based on the amount of latency in the response of the first luminaire or the second luminaire to the stimulus.

8. A computing device, comprising:
    one or more processors; and
    memory connected to the one or more processors, the memory comprising instructions that, when executed by the one or more processors, cause the one or more processors to perform operations that include:
        receiving, from a first luminaire, first sensor data in response to a stimulus affecting a network of luminaires that the one or more processors are in communications with;
        receiving, from a second luminaire, second sensor data in the network of luminaires, wherein the second sensor data is generated by the second luminaire in response to the stimulus;
        determining a correlation between the first sensor data and the second sensor data;
        modifying a luminaire spatial-temporal model based at least partially on the correlation between the first sensor data and the second sensor data, wherein the luminaire spatial-temporal model is based on gradient distribution data for multiple types of sensors integrated into the network of luminaires, and the multiple types of sensors include at least a passive infrared sensor;
        receiving subsequent sensor data from the first luminaire or the second luminaire; and
        providing a signal to the first luminaire or the second luminaire based on a comparison of the subsequent sensor data to the modified luminaire spatial-temporal model.

9. The computing device of claim 8, wherein determining the correlation includes generating a probabilistic metric, and the operations further include:
    determining that the probabilistic metric satisfies a probabilistic threshold.

10. The computing device of claim 8, wherein the first sensor data or the second sensor data include data from multiple types of sensors.

11. The computing device of claim 10, wherein determining the correlation includes determining a change in correlation between data from the multiple types of sensors.

12. A system, comprising:
one or more processors; and
memory configured to store instructions that, when executed by the one or more processors, cause the one or more processors to perform operations that include:
generating first sensor data at the one or more processors, wherein the one or more processors are in communication with a network of luminaires;
receiving second sensor data from a luminaire in the network of luminaires, wherein the second sensor data is generated by the luminaire;
comparing the first sensor data and the second sensor data to a luminaire spatial-temporal model to identify a variance between the first sensor data and the luminaire spatial-temporal model or the second sensor data and the luminaire spatial-temporal model, wherein the luminaire spatial-temporal model is based on historical sensor data collected from adjacent luminaires in the network of luminaires and wherein the variance corresponds to a probabilistic metric;
determining that the probabilistic metric satisfies a probabilistic threshold; and
when the variance is identified, causing the one or more processors, or the luminaire, to operate to compensate for the variance, wherein the variance corresponds to a probabilistic metric.

13. The system of claim 12, wherein the operations further include:
determining that a subsequent probabilistic metric does not satisfy the probabilistic threshold.

14. The system of claim 12, wherein the first sensor data or the second sensor data include data from multiple types of sensors.

15. The system of claim 14, wherein the operations further include:
determining a change in correlation between data from the multiple different types of sensors.

16. The system of claim 12, wherein the operations further include:
modifying the luminaire spatial-temporal model based on the one or more processors, or the luminaire, operating to compensate for the variance, wherein the luminaire spatial-temporal model is stored in the memory.

17. The system of claim 12, wherein compensating for the variance data includes limiting an amount of data that is provided from a sensor.

18. The system of claim 12, wherein the luminaire spatial-temporal model identifies gradient distributions for the historical sensor data collected from the adjacent luminaires.

19. The system of claim 12, further comprising a lighting device, wherein the first sensor data and the second sensor data are based on an amount of light detected at an area illuminated by the network of luminaires.

* * * * *

UNITED STATES PATENT AND TRADEMARK OFFICE
CERTIFICATE OF CORRECTION

| | |
|---|---|
| PATENT NO. | : 11,310,892 B2 |
| APPLICATION NO. | : 16/769113 |
| DATED | : April 19, 2022 |
| INVENTOR(S) | : Olaitan Philip Olaleye, Tamir Hegazy and Abhishek Murthy |

It is certified that error appears in the above-identified patent and that said Letters Patent is hereby corrected as shown below:

On the Title Page

Please insert the section:
--Related U.S. Application Data:
(60) Provisional Application No. 62/594,801, filed on December 5, 2017.--

Signed and Sealed this
Ninth Day of August, 2022

Katherine Kelly Vidal
*Director of the United States Patent and Trademark Office*